United States Patent [19]

Oguchi et al.

[11] Patent Number: 5,418,077
[45] Date of Patent: May 23, 1995

[54] MAGNETIC RECORDS MEDIUM HAVING MULTIPLE MAGNETIC LAYERS FOR RECORDING IN LONG AND SHORT WAVELENGTH

[75] Inventors: Toshihiko Oguchi; Hajime Takeuchi, both of Kanagawa; Seiichi Tobisawa, Tokyo; Toshio Fukaya; Ken-ichi Furuhata, both of Kanagawa, all of Japan

[73] Assignees: Kabushiki Kaisha Toshiba, Kanagawa; Konica Corporation, Tokyo, both of Japan

[21] Appl. No.: 885,335

[22] Filed: May 19, 1992

[30] Foreign Application Priority Data

May 20, 1991 [JP] Japan ................... 3-114439
Apr. 27, 1992 [JP] Japan ................... 4-107744

[51] Int. Cl.$^6$ .......................... G11B 5/66; G11B 5/70; G11B 5/72
[52] U.S. Cl. ........................ 428/694 BM; 428/695; 428/900
[58] Field of Search .............. 428/694, 695, 900, 329, 428/694 B, 694 BS, 694 BM

[56] References Cited

U.S. PATENT DOCUMENTS

| | | | |
|---|---|---|---|
| 5,032,428 | 7/1991 | Ogawa et al. | 428/695 X |
| 5,077,131 | 12/1991 | Nakano | 428/423.9 |
| 5,098,773 | 3/1992 | Saito et al. | 428/212 |
| 5,114,778 | 5/1992 | Yanai et al. | 428/141 |
| 5,149,585 | 9/1992 | Goto et al. | 428/323 |
| 5,158,822 | 10/1992 | Saito et al. | 428/212 |

FOREIGN PATENT DOCUMENTS

1066818  3/1989  Japan ................... G11B 5/716

OTHER PUBLICATIONS

Patent Abstrcts of Japan, vol. 14, No. 581 (P-1147) Dec. 26, 1990, & JP-A-2 249 129 (Konica Corporation), Oct. 4, 1990.
Patent Abstracts of Japan, vol. 13, No. 279 (P-891) Jun. 17, 1989, & JP-A-1 066 818 (Matsushita Electric Ind. Co.), Mar. 13, 1989.

*Primary Examiner*—D. S. Nakarani
*Assistant Examiner*—H. Thi Lê
*Attorney, Agent, or Firm*—Finnegan, Henderson, Farabow, Garrett & Dunner

[57] ABSTRACT

A magnetic recording medium comprises a non-magnetic base material; a lower magnetic layer containing a magnetic powder for recording in a long wavelength range and a resin binder; an upper magnetic layer containing a magnetic powder for recording in a short wavelength range and a resin binder; and an intermediate layer disposed between the two magnetic layers. By properly selecting the type and amount of resin binder contained in the upper magnetic layer and by disposing the intermediate layer whose main component is a resin binder, dispersion property of the magnetic powder in the upper magnetic layer can highly be improved, and thin and smooth magnetic layers can be obtained. Thus, the recording medium provides excellent reproduction characteristics in the wide wavelength range and has excellent running durability. In particular, the reproduction characteristics in a short wavelength range can be improved. A hexagonal ferrite powder is suitably used as the magnetic powder for recording in the short wavelength range. As the resin binder for the intermediate layer, a polyisocyanate compound whose molecular weight is 1,000 or less is particularly effective.

14 Claims, No Drawings

MAGNETIC RECORDS MEDIUM HAVING MULTIPLE MAGNETIC LAYERS FOR RECORDING IN LONG AND SHORT WAVELENGTH

BACKGROUND OF THE INVENTION

1. Field of the Invention

The present invention relates to a magnetic recording medium with a high recording density and excellent recording characteristics in a wide wavelength range from a short wavelength to a long wavelength.

2. Description of the Related Art

Conventionally, a coated type magnetic recording medium is produced by coating a magnetic powder such as γ ferrite or iron powder on a base material such as a polyester film along with a resin binder. This resin binder is added so as to improve the dispersion property of the magnetic powder and the running durability of the magnetic recording medium. It is known that the amount of resin binder to be added to a magnetic powder of 100 parts by weight is at least 10 parts by weight.

Recently, needs of magnetic recording media with high recording density have been increasing. As one of the methods for satisfying such needs, the particle diameter of the magnetic powder is decreased and the coercive force (Hc) thereof is strengthened. As fine-particle magnetic powders employable for high density recording, a metal powder whose particle diameter is 0.3 μm or less, an ultra-fine hexagonal powder such as barium ferrite and others are suitable. This is because the above mentioned fine-particles of magnetic powders are so arranged in the magnetic layer, which is made by smoothly coating the particles on the base material with a high packing ratio, that magnetized direction of them are perpendicular to the medium surface and not magnetically repulsive one another. Thus, this type of magnetic recording media is suitable for high density recording.

However, although a magnetic layer containing a fine magnetic powder with a high coercive force has high reproduction output in a short wavelength range, the reproduction output in a long wavelength range is inferior to that of the conventional medium containing needle shaped γ-ferrite. To solve such a problem, a two-layer coated magnetic recording medium has been proposed. The two-layer type coating magnetic recording medium comprises a non-magnetic base material, a lower magnetic layer containing a magnetic powder with a relatively low coercive force suitable for recording in a long wavelength range, and an upper magnetic layer containing a magnetic powder with a small particle diameter and a high coercive force suitable for recording in a short wavelength range. The lower magnetic layer is disposed on the non-magnetic base material, the upper magnetic layer being disposed on the lower magnetic layer. Thus, this two-layer coated magnetic recording medium can deal with a wider wavelength range.

To satisfactorily obtain the characteristics of this two-layer coated medium, it is preferable to set the thickness of the upper magnetic layer to an order of submicrons. To do this, it is necessary to decrease as small the surface roughness of the upper magnetic layer as possible, thereby improving the smoothness of the surface. Thus, it is also necessary to decrease as low the surface roughness of the lower magnetic layer as possible, thereby preventing the surface property of the lower magnetic layer from negatively affecting that of the upper magnetic layer.

In addition, to improve the reproduction output of the magnetic recording medium, the magnetic particles of the magnetic coating materials composing the upper magnetic layer should be dispersed into the resin binder in the state that each magnetic particle is separated almost individually, i.e., in the state of almost primary particles. Moreover, the packing ratio of the magnetic particles to the resin binder should be as high as possible.

However, in the conventional two-layer coated medium, it has been difficult to set the coating thickness of the upper magnetic layer to an order of submicrons. This is because the surface property of the lower magnetic layer negatively affects that of the upper magnetic layer. Moreover, disturbance which takes place at the interface between the lower magnetic layer and the upper magnetic layer has resulted in increase of noise in recording and reproducing. These problems have been especially remarkable when the lower magnetic layer and the upper magnetic layer are coated on the base material at the same time. For example, when the upper magnetic layer having a coating thickness of 0.5 μm or less has been formed, part of the lower magnetic layer has been occasionally extruded to the upper magnetic layer.

Furthermore, as the size of magnetic powder particles for use with the upper magnetic layer are so small, it has been becoming difficult to mix these particles with resin binder so thoroughly that each particle are separated individually. Likewise, it has been becoming further difficult to decrease the amount of resin binder, so as to increase the packing ratio of the magnetic powder, and it has also been becoming difficult to decrease the surface roughness. As the size of the magnetic powder particles is smaller, it is technically more difficult to improve the reproduction output of the magnetic recording medium.

In other words, according to the needs of high recording density of the magnetic recording media, the dispersion techniques of ultra-fine magnetic powders for use with the upper magnetic layer have not been satisfactorily established. In addition, the smoothness of the coated surface and the packing density of the magnetic powder of the upper magnetic layer have not been adequately improved. As a result, the reproduction output level in a short wavelength range has not achieved the level as is expected from the particle diameter of the magnetic powder for use with the upper magnetic layer. Moreover, when the magnetic powder for use with the upper magnetic layer has been dispersed insufficiently, noise in recording and reproducing has been increased. These problems also has been resulted in difficulties when recording in a short wavelength range.

SUMMARY OF THE INVENTION

The present invention is made from the above mentioned point of view. An object of the present invention is to improve the smoothness of the surface of the upper magnetic layer of a two-layer type magnetic recording medium, thereby improving the recording and reproduction characteristics in a wide wavelength range, particularly, in a short wavelength range. According to the present invention, since the dispersion property and the packing ratio of a magnetic powder are enhanced, the smoothness of the surface of the upper magnetic layer is improved.

The magnetic recording medium according to the present invention comprises a non-magnetic base material, a lower magnetic layer containing a magnetic powder for recording in a long wavelength range and a resin binder, an upper magnetic layer containing a magnetic powder for recording in a short wavelength range and a resin binder, and an intermediate layer mainly composed of a resin binder. The lower magnetic layer is disposed on the base material, the upper magnetic layer is disposed as a surface layer, and the intermediate layer is disposed between the lower magnetic layer and the upper magnetic layer. The amount of resin binder contained in the upper magnetic layer being in the range from 2 to 12 parts by weight, more preferably, in the range from 3 to 8 parts by weight, for a magnetic powder of 100 parts by weight.

The above mentioned resin binder is defined as a total amount of a resin binder which is added for dispersing a magnetic powder and a hardener which is added prior to coating thereof. When the amount of a resin binder for a magnetic powder of 100 parts by weight is less than 2 parts by weight, the magnetic powder cannot be satisfactorily dispersed. Thus, the desired reproduction output cannot be obtained. In addition, a required strength of coated surface also cannot be obtained. Thus, the amount of resin binder which is less than 2 parts by weight is not preferable. In contrast, when the amount of resin binder exceeds 12 parts by weight, the packing ratio of the magnetic powder decreases. Likewise, the desired reproduction output cannot be obtained. Thus, the amount of resin binder which exceeds 12 parts by weight is also not preferable.

The intermediate layer in accordance with the present invention can be composed of a resin binder only. Alternatively, along with the resin binder, a magnetic powder for use with the upper magnetic layer, a magnetic layer for use with the lower magnetic powder, a mixture thereof, or various inorganic/organic additives for use with conventional magnetic coating materials can be added.

In accordance with the present invention, it is preferable that the thickness of the lower magnetic layer of the magnetic recording medium should be in the range from 1 to 3 $\mu m$, the thickness of the intermediate layer thereof should be in the range from 0.05 to 0.3 $\mu m$, and the thickness of the upper magnetic layer thereof should be in the range from 0.05 to 0.5 $\mu m$. When the thickness of the lower magnetic layer is less than 1 $\mu m$, the properties for recording in a long wavelength range cannot be obtained. In contrast, when the thickness of the lower magnetic layer exceeds 3 $\mu m$, the surface property and the coating strength cannot be obtained. Moreover, when the thicknesses of the intermediate layer and the upper magnetic layer are less than 0.05 $\mu m$, the desired properties with respect to the adhesive strength of the layers and the reproduction output in a short wavelength range are deteriorated. Thus, the upper limits of the thicknesses of the intermediate layer and the upper magnetic layer are determined from a point view of deterioration of surface property and a space loss effect for recording in a long wavelength range.

According to the present invention, examples of the resin binder for dispersing coating materials for use with the lower magnetic layer, the intermediate layer, and the upper magnetic layer are copolymers of vinyl chloride and vinyl acetate, polyester resin, polyether resin, polyurethane resin, and polyacrylic resin or the like, having a polar group such as hydroxyl group, carboxyl group, phosphoric acid group, —SO$_3$M group, —OSO$_3$M group (M is hydrogen or an alkali metal atom), amino group, alkyl group, ammonium group, or alkyl ammonium group. Among them, a resin binder containing a repeating unit having at least one polar group selected from the group consisting of —SO$_3$M and —OSO$_3$M is particularly suitable for a resin binder in accordance with the present invention. This is considered to be because each of these resin binders fittingly adsorbs to a magnetic powder, thereby helping dispersion thereof. And, it is not necessary for a single polar group to exist in a resin molecule. Even if two or more types of polar groups coexist in the same molecule, the effect of the present invention is not lost at all. The amount of polar group in the resin binder is important. To accomplish the effect of the present invention, the amount of polar group is preferably at least in the range from 0.01 mmol/g to 4.0 mmol/g, more preferably, in the range from 0.05 mmol/g to 2.0 mmol/g.

According to the present invention, an example of the resin binder to be added prior to coating magnetic coating materials for use with the lower magnetic layer, the intermediate layer, and the upper magnetic layer is a polyisocyanate compound. This resin binder can be added not only prior to coating but when the magnetic coating materials are dispersed.

According to the present invention, the molecular weight (Mw) of the above mentioned resin binder is preferably 60,000 or less. However, the molecular weight of the resin binder for use with each layer should be varied to some extent in accordance with the object thereof. For example, with respect to the upper magnetic layer, the packing ratio of the magnetic powder should be high. Thus, with respect to the upper magnetic layer, a resin binder whose molecular weight is relatively low and is in the above mentioned range is used. But, when the molecular weight of the resin binder is less than 1,000, the effect thereof is low. In contrast, when the molecular weight of the resin binder exceeds 20,000, since the required amount thereof increases, the required high packing ratio cannot be attained. In other words, it is preferable that the molecular weight of the resin binder for use with the upper magnetic layer should be in the range from 1,000 to 20,000. Generally, with respect to the lower magnetic layer, to improve durability, a resin binder whose molecular weight is 10,000 or more is used. With respect to the intermediate layer, to improve durability, a resin binder whose molecular weight is 10,000 or more generally can be used like that for use with the lower magnetic layer. In addition, even if a resin binder whose molecular weight is less than 10,000, a polyisocyanate compound with a molecular weight of less than 1,000 and multi-functional groups can be preferably used as a resin binder for use with the intermediate layer so as to form a film with high durability.

Among the polar groups with respect to the resin binder in accordance with the present invention, —SO$_3$M and —OSO$_3$M groups can be obtained in the following manner. When a resin binder containing at least one polar group selected from the group consisting of —SO$_3$M and —OSO$_3$M is a resin made by vinyl polymerization, vinyl monomer containing this polar group is copolymerized with conventional vinyl monomer containing no polar group. On the other hand, when the resin binder containing the above mentioned polar group is a polyester resin or a polyurethane resin, polybasic acid or polyhydric alcohol which is a constitutive component thereof is mixed with polybasic acid or polyhydric alcohol which contains the above mentioned polar group, and then a condensation reaction thereof is performed. Thus, the resin binder containing the above mentioned polar group can be obtained. Examples of the vinyl monomer, polybasic acid, and polyhydric alcohol containing the above mentioned polar group are vinyl sulfonic acid, vinyl benzene sulfonic acid, metal salts of 2-acrylic amide-2-methyl propane sulfonic acid and compounds substantially given by the following chemical formula

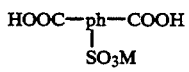

(where ph is an aromatic ring, and M is an alkaline metal).

Examples of a conventional vinyl resin monomer which is copolymerized with vinyl monomer having a polar group such as metal salt of sulfonic acid are various types of monomers including vinyl chloride, vinyl alcohol, maleic anhydride, vinyl acetate, acrylate monomers, vinylidene chloride, vinyl acetal, vinyl butyral, acrylic esters, acrylonitrile, and styrene.

Examples of the conventional polybasic alcohol which is copolymerized with a polybasic acid having a polar group such as sulfonic acid metal salt are 1,4-butanediol, 1,6-hexamethylenediol, cyclohexanediol, ethylene glycol, diethyleneglycol, triethyleneglycol, propyleneglycol, glycerin, and neopentyl alcohol. On the other hand, examples of the polybasic acid which is copolymerized with polyhydric alcohol having a polar group such as sulfonic acid metal salt are terephthalic acid, isophthalic acid, adipic acid, sebacic acid, oxalic acid, succinic acid, glutaric acid, pyromellitic acid, suberic acid, and azelaic acid.

Among the resins which contain sulfonic acid metal salt group obtained in the above mentioned manner in accordance with the present invention, polyester polyurethane resin is especially suitable. In particular, a polyester polyurethane resin which contain polybasic acid having an aliphatic chain whose carbon number is in the range from 4 to 18 or those containing a polyhydric alcohol in the resin skeleton. These polyester polyurethane resins are so urethanated by aromatic diisocyanate such as tolylenediisocyanate or aliphatic diisocyanate such as 1,4-tetramethylenediisocyanate, 1,6-hexamethylenediisocyanate, and isophoronediisocyanate, that the dispersion property and durability thereof can be further improved.

In addition, to improve the mechanical strength and the running property of the coated films, various resin binders can be added. Examples of the resins which can be added are polyurethane resin, polyester resin, polycarbonate resin, polyacrylic resin, polyamide resin, epoxy resin, phenol resin, polyether resin, phenoxy resin, melamine resin, vinyl butyral resin, furan resin, vinyl chloride resin, vinyl acetate resin, vinyl alcohol resin, mixtures thereof, and copolymers thereof. The amount of the resin binders being added is 80 weight % or less of all the resin binders.

In the constitution of the present invention, it is preferable that a magnetic powder for use with the lower magnetic layer should have a coercive force (Hc) in the range from 300 to 1,000 Oe and a saturation magnetization (Ms) of 70 emu/cc or more. Examples of the magnetic powder having such properties are a metal powder whose main component is iron, a magnetite powder, a $\gamma$-ferrite powder, a Co-denatured $\gamma$-ferrite powder, a Co-denatured magnetite powder, a chromium dioxide powder and an iron nitride powder. The diameter of particles of these magnetic powders are preferably in the range from 0.3 to 1.0 $\mu$m.

Examples of a magnetic powder for use with the upper magnetic layer are a metal powder whose main component is iron and a hexagonal ferrite powder. Examples of the metal powder whose main component is iron are a Fe—Al metal powder, a Fe—Ni metal powder, a Fe—Al—P metal powder, a Fe—Ni—Si—Al metal powder, a Fe—Si—Al—Mn metal powder, a Fe—Mn—Zn metal powder, a Fe—Co—Ni metal powder, a Fe—Co—Ni—Cr metal powder, and a Fe—Co—Ni—P metal powder.

Among them, the hexagonal ferrite powder is particularly suitable for use with the upper magnetic layer. Examples of the hexagonal ferrite powder are Ba ferrite, Sr ferrite, Pb ferrite, and Ca ferrite which are M (Magnetoplumbite) or W (Wurtzite) type hexagonal ferrite; and ion-substituted bodies substantially given by the following chemical formula,

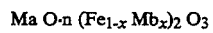

where Ma is one element selected from the group consisting of Ba, Sr, Ca, and Pb; Mb is at least two elements selected from the group consisting of Co, Zn, Ni, Cu, Mg, Mn, In, Ti, Sn, Ge, Zr, Hf, V, Nb, Sb, Ta, Cr, Mo, and W, one element being Nb; and n is a number in the range from 5.4 to 6.0.

More specifically, the hexagonal ferrite powder in accordance with the present invention is preferably a powder where part of Fe atoms which are a constitutive element of the uniaxial hexagonal ferrite crystal are substituted with a metal whose valence is 2 and Nb whose valence is 5. In addition, the hexagonal ferrite powder in accordance with the present invention is preferably a powder where part of Fe atoms are substituted with 0.05 to 0.5 Sn atom per chemical formula, the amount of substitution being set so that the magnetic coercive force is in the range from 500 to 3,000 Oe.

The 2 valence metals of the substituted elements mainly serve to decrease the coercive force of the hexagonal ferrite powder in a proper level. On the other hand, Nb, whose valence is 5, serves to increase the amount of saturation magnetization. In addition, Sn, whose valence is 4, serves to decrease a fluctuation of temperature property of the coercive force.

The adequate amount of substitution of the 2 valence metal ($M^{II}$) and that of the 5 valence metal ($M^{V}$) varies in accordance with a combination of $M^{II}$ and $M^{V}$. The amount of substitution of $M^{II}$ per chemical formula is approximately in the range from 0.5 to 1.2.

For example, the relation of the amounts of substitution of substituted elements with respect to magnetoplumbite type Ba ferrite can be substantially given by the following chemical formula,

where x, y, and z are the amounts of substitution of $M^{II}$, $M^{V}$, and $M^{IV}$ elements per chemical formula, respectively. The $M^{II}$, $M^{V}$, and $M^{IV}$ elements are a 2 valence metal, a 5 valence metal, and a 4 valence metal, respectively. In addition, the Fe atom to be substituted is a 3 valence metal. In consideration of compensation of valence, the relation of $y=(x-z)/2$ is satisfied. In other words, the amount of substitution of $M^V$ can be uniformly determined from the substitution amounts of $M^{II}$ and $M^{IV}$.

When Sn is used as a $M^{IV}$ element, the proper amount of substitution of hexagonal ferrite per chemical formula is in the range from 0.05 to 0.5.

In addition, Ti with the same valence as Sn can be used.

Most of the metal powders containing iron as a main component which can be used for the upper magnetic layer in accordance with the present invention have needle shaped crystal forms. The particle diameters of their metal powders are represented with the length of their longer axis. The average particle diameters of the metal powders in accordance with the present invention are preferably in the range from 0.05 to 0.3 $\mu$m.

The above mentioned hexagonal ferrite powders have hexagonal plate shaped single crystal forms. The particle diameters of their hexagonal ferrite are represented with the length of the diagonal line of plate. The average particle diameters of the hexagonal ferrite powders in accordance with the present invention are preferably in the range from 0.01 to 0.1 $\mu$m. When the particle diameters of these magnetic powders are less than 0.01 $\mu$m, the amount of magnetization or the amount of coercive force decreases, thereby lowering reproduction output of the resultant magnetic recording media. In contrast, when the particle diameters of these magnetic powders exceed 0.1 $\mu$m, not only the improved effect of the reproduction output in a short wavelength range of the media being produced degrades, but also noise in recording and reproducing signals remarkably increases.

The coercive force of the metal powders and the hexagonal ferrite powders in accordance with the present invention is preferably in the range from 500 to 3,000 Oe. When the coercive force is less than 500 Oe, recording signals are not satisfactorily remaining on the recording media. In contrast, when the coercive force exceeds 3,000 Oe, the conventional recording and reproducing heads cannot properly write signals on the media.

Then, a general method for obtaining the magnetic recording medium in accordance with the present invention will be described.

A magnetic coating material for use with the magnetic recording medium in accordance with the present invention is produced in the following manner. First, a magnetic powder, a resin binder, and an organic solvent are mixed with each other. Thereafter, the magnetic powder is dispersed in the mixture by using a ball mill or a sand grinder. Thereby, a magnetic coating material is produced. Examples of the organic solvent are toluene, xylene, cyclohexanone, methyl ethyl ketone, methyl isobutyl ketone, and nitropropane. One of these organic solvents or these several organic solvents mixed together can be used. Moreover, to improve the mechanical strength of the coated film and the durability thereof, it is possible to add a polyamine type hardener or a polyisocyanate type hardener to the coating material. As described above, the resin binder in accordance with the present invention is defined as a total amount of a resin binder which is added for dispersing a magnetic powder and a hardener which is added prior to coating thereof. In addition to the hardener, if necessary, it is possible to add a dispersant, a lubricant, an abrasive and electroconductive agent which will be described in detail.

Examples of the dispersant for dispersing a magnetic powder of the upper magnetic layer into a resin binder are an anionic surface active agent, a cationic surface active agent, and a non-ionic surface active agent. As an anionic surface active agent, a nonylphenol ester of phosphoric acid and lecithin are especially effective. In the kneading step of a magnetic powder and a resin binder, by adding a silane coupling agent or a titan coupling agent besides such dispersants, the magnetic powder can be further equally dispersed.

It is preferable that a lubricant should be added to at least one of the lower magnetic layer, the intermediate layer, and the upper magnetic layer. Example of the preferable lubricant are fatty acid whose carbon number is 12 or more, fatty acid ester, silicone oil, fluorinated silicone oil, and fluorinated hydrocarbon oil.

As an abrasive for use with the lower magnetic layer, the intermediate layer, and the upper magnetic layer, a powder of inorganic substance whose Morse hardness is 5 or more can be added. Examples of the abrasive are alumina, titania, chromia, zirconia, and silicon carbide.

In addition, if necessary, a powder of electroconductive agent can be added to the lower magnetic layer or the intermediate layer. Examples of this powder are carbon black, titanium oxide, and tin oxide.

Examples of the non-magnetic base material in accordance with the present invention are a polyester film, a polycarbonate film, a polyimide film, a polysulfonate film, a polyamide film, and a polyoxazole film. It is preferable that a back layer containing a powder of electroconductive agent such as carbon black should be formed on a surface where a magnetic coating material is not coated. This back layer serves to prevent static electricity from taking place on the base material, improve the running property of the medium, and prevent blocking with the magnetic layer. Thus, the back layer is produced so that it has a surface resistance of $10^6 \Omega$ or less. In addition, the surface property of the back layer is also very important. The average surface roughness (Rz) of the back layer measured by a needle contacting type surface roughness meter for 10 points should be 0.5 $\mu$m or less.

Moreover, to improve the adhesive strength of the magnetic layers to the base material in accordance with the present invention and thereby enhance the durability of the medium, a plasma treatment for the base material or a base layer containing carbon black coated on the base material is especially effective. This base layer, the lower magnetic layer, the intermediate layer, and the upper magnetic layer can be produced by using a four-layer coating slot die coater with one coating operation.

When a coating material for use with the upper magnetic layer is produced, a metal powder for use with the upper magnetic layer or a magnetic powder such as a hexagonal ferrite powder is mixed and dispersed in a resin binder, an organic solvent, and a mixture of the above mentioned various additives. In these mixing and dispersing steps, it is important to equally disperse the magnetic powder in the resin binder. Thus, the magnetic powder can be packed to the magnetic layers at a high rate. As the magnetic powder is equally dispersed, noise in recording and reproducing decreases, and the surface property of the magnetic layers are improved, thereby increasing the output in the short wavelength range.

To equally disperse the magnetic powder, a method for kneading the above mentioned mixture in advance and furthermore dispersing the resultant substance by a ball mill or a sand glass is effective. When a hexagonal ferrite powder is produced by a glass crystallizing method, and obtained in water in a slurry state, it is possible to add the above mentioned resin binder and the additive to the slurry and then knead the mixture. This kneading method is referred to as flashing method. According to this method, without a negative effect of the coagulation in the drying step of magnetic powder, it is possible to adsorb molecules of the resin binder or those of the dispersant to the surface of the magnetic powder. Thus, the magnetic powder can be equally dispersed easily.

The kneaded substance is dewatered under a reduced pressure environment while an organic solvent is added. Alternatively, the kneaded substance is obtained as a dried powder. Thereafter, an organic solvent is added to the dried substance and then transferred to a dispersion device such as a sand grinder so as to more equally disperse the magnetic powder.

After the dispersion step, the magnetic coating material is filtered by a filter and then a hardener such as polyisocyanate is added thereto. Thereafter, the resultant coating material is applied on the base material by a conventional coating method using a reverse coater, a gravure coater, an applicator coater, a slot die coater, or the like.

Among such devices, the slot die coater is suitable for obtaining the effect in accordance with the present invention. By using the slot die coater, the lower magnetic layer, the intermediate layer, and the upper magnetic layer can be coated substantially at the same time. The "substantially at the same time" means that the upper magnetic layer is coated before the organic solvent of the coating material of the lower magnetic layer is not evaporated and dried. Thus, even if these layers are coated not at the same time, but with a slight delay, it is construed that these layers should be coated at the same time. Thus, it is not always necessary to integrate the slot dies into one device.

Thereafter, before the organic solvent in the film evaporates, the multi-layer coated film formed on the base material is guided to a magnetic field oriented in the longitudinal direction or vertical direction of the surface of the base material. The magnetic powder contained in the magnetic layer is oriented so that the easily magnetizable axis is oriented to the direction of the magnetic field.

The vertical orientation is accomplished by passing the coated film perpendicularly to the magnetic field produced between an N pole iron core and an S pole iron core which are arranged opposite to each other. On the other hand, the longitudinal orientation is accomplished by passing the coated film between two iron cores with the same pole or by passing the base material at the center of a solenoid (air core coil). It is preferable that the coated film should be dried when it exits from the magnetic field. To remove the organic solvent in the magnetic field, it is preferable that a heating plate and a vapor sucking device or a hot air blower and an air exhausting device should be provided.

After the predetermined orientation treatment is performed for the coated film by the above mentioned steps, the surface thereof is smoothened by a calender. Thereafter, the surface of the coated film is cured and slit in a desired width. Thus, the magnetic recording medium in accordance with the present invention is obtained. For the magnetic recording medium in accordance with the present invention, the shape of the sliced surface by the slitting step is important. When the coated film is improperly slit, the surface of the magnetic layers in the vicinity of the sliced portion will be cracked. When the surface of the magnetic layer is cracked, the images recorded and reproduced will be disordered or the running durability of the medium will be deteriorated. Such a problem can be solved by slitting the coated film with a laser light.

In accordance with the present invention, since there are provided the lower magnetic layer containing magnetic powder with low coercive force and high saturation magnetization and the upper magnetic layer containing magnetic powder with high coercive force, small particle diameter, and high packing ratio, the medium having high recording characteristics both in a short wavelength range and in a long wavelength range can be obtained.

With respect to the upper magnetic layer in accordance with the present invention, since a resin binder which contains a polar group such as sulfonic acid salt group having a high adsorption property and whose molecular amount is limited to a predetermined range is selected, this resin binder properly adsorbs to the magnetic powder, thereby helping the dispersion of the magnetic powder. Thus, the amount of the resin binder to be added to a metal powder or a hexagonal ferrite powder of 100 parts by weight can be limited to a very small range of 2 to 12 parts by weight in comparison with the magnetic layers of the conventional magnetic recording medium. Thus, the magnetic layers packed with the magnetic powder having high Hc and small particle diameter can be obtained at high packing ratio. As the magnetic powder is equally dispersed, the surface property of the magnetic layers being formed is improved.

The intermediate layer provided in accordance with the present invention serves to prevent the constitutive components of the upper magnetic layer from being mixed with those of the lower magnetic layer. In addition, the intermediate layer serves to prevent the surface property of the lower magnetic layer from negatively affecting the upper magnetic layer. Thus, the surface of the upper magnetic layer can be smoothened. Therefore, the properties of the two-layer coated type magnetic recording medium can be satisfactorily achieved. This effect can be remarkably obtained when the thickness of the upper magnetic layer is 0.5 $\mu$m or less.

In addition, the intermediate layer allows the upper magnetic layer containing a magnetic powder with a high packing ratio to be strongly adhered to the lower magnetic layer. Thus, the running durability of the medium is improved. Moreover, when an inorganic additive such as an abrasive and an organic additive such as a lubricant are added to the intermediate layer along with the lower magnetic layer, the recording and reproduction properties and the running durability of the upper magnetic layer can be further improved.

The addition of the abrasive and the lubricant to the intermediate layer is particularly effective when the upper magnetic layer is very thin, namely the thickness thereof is on the order of submicrons or less.

For example, when a large amount of lubricant is contained below the upper magnetic layer, the intermediate layer can be used as a source layer of the lubricant. In this case, as the lubricant is lost from the medium, the lubricant gradually soaks out to the surface of the medium so as to improve the running stability thereof.

Furthermore, the intermediate layer is effective to prevent the lower magnetic layer from being oxidized or corroded. Thus, the medium has a resistance to an environmental change. This effect is especially useful when a metal powder or iron oxide covering with a large amount of cobalt is used as a magnetic powder for use with the lower magnetic layer.

In addition, when a polyisocyanate compound whose molecular weight is 1,000 or less, which is generally referred to as a hardener for polyurethane resin, is used as a resin binder which is a main component of the intermediate layer, the amount of hardener to be mixed with the magnetic coating material for use with the upper magnetic layer and the lower magnetic layer can be decreased. This is because the polyisocyanate compound contained in the intermediate layer is diffused and penetrated into both the upper magnetic layer and the lower magnetic layer when the intermediate layer is coated along with the upper magnetic layer and the lower magnetic layer.

Moreover, since the adhesive force of the hardener of polyisocyanate compound is very strong, it is very useful for preventing the upper magnetic layer from peeling off from the lower magnetic layer. Further, since the number of cross linking groups of the hardener of polyisocyanate compound is large in comparison with the molecular weight thereof, the cross linking density of the polyisocyanate layer being hardened is very high. As a result, the hardener of polyisocyanate compound has a remarkable effect for preventing a corrosive substance from penetrating through the layers. Thus, the hardener of polyisocyanate compound can further prevent a metal powder easily deteriorated, Co denatured ferrite powder, or Co denatured magnetite powder for use with the lower magnetic layer from being deteriorated.

DESCRIPTION OF PREFERRED EMBODIMENTS

Then, preferred embodiments in accordance with the present invention will be described in detail.

Embodiment 1

First, the following materials of the <coating material for lower magnetic layer> were measured and loaded into a kneader.

Compositions of <coating material for lower magnetic layer>

Co-γ ferrite powder . . . 100 parts by weight
(Hc=650 Oe; number average particle diameter=0.5 μm; specific surface area=40 m²/g)
Carbon black . . . 5 parts by weight
(Average particle diameter=0.02 μm; specific surface area=200 m²/g)
Urethane resin containing sulfonic acid group . . . 10 parts by weight
(Molecular weight Mw=30,000; content of sodium sulfonate group=0.3 mmol/g)
Copolymer of Vinyl chloride and vinyl acetate . . . 5 parts by weight
(Mw=20,000; content of carboxyl group=0.4 mmol/g)
Lecithin of soybean oil . . . 2 parts by weight Stearic acid . . . 2 parts by weight
Butyl stearate . . . 2 parts by weight
Cyclohexanone/methyl ethyl ketone . . . 30 parts by weight
(1/1 mixed solvent)

After these materials were kneaded, the kneaded mixture was added with the above mentioned mixed solvent of 150 parts of weight and then diluted by a dissolver. Thereafter, the resultant mixture was dispersed by a sand grinder. Then, a coating material was obtained. Thereafter, the coating material was filtered by a filter with a pore size of 0.6 μm. The filtered coating material was added with Colonate L (tradename: 50 % diluted substance of a tolylenediisocyanate group hardener: Nippon Polyurethane K.K.) of 1.5 parts by weight. Thus, the coating material for the lower magnetic layer was obtained.

Then, the following materials of <coating material for intermediate layer> were mixed by the dissolver and then filtered by a filter with a pore size of 0.3 μm.

Compositions of <coating material for intermediate layer>

Urethane resin . . . 100 parts by weight (Mw=30,000; glass transition temperature=−20° C.)
Myristic acid . . . 30 parts by weight
Butyl stearate . . . 30 parts by weight
Cyclohexanone/methyl ethyl ketone . . . 300 parts by weight (1/1 mixed solvent)

Thereafter, the resultant mixture was added with Colonate L (tradename: 50% diluted substance of a tolylenediisocyanate group hardener: Nippon Polyurethane K.K.) of 1.5 parts by weight and then mixed. Thus, a coating material for the intermediate layer was obtained.

In addition, the following materials of <coating material for upper magnetic layer> were measured and loaded into the kneader.

Compositions of <coating material for upper magnetic layer>

Co-, Ti-, Nb-substituted barium ferrite powder . . . 100 parts by weight
(Hc=1,000 Oe; number average particle diameter=0.05 μm; specific surface area=38 m²/g)
Sulfonated urethane resin . . . 4 parts by weight
(Mw=10,000; content of sodium sulfonate group=0.5 mmol/g)
Gafac RE-610 . . . 2 parts by weight
(Trade name: phosphoric acid ester group surface active agent: Toho Chemical K.K.)
Stearic acid . . . 1 part by weight
Alumina . . . 5 parts by weight
(Median diameter=0.4 μm)
Cyclohexanone/methyl ethyl ketone . . . 25 parts by weight
(1/1 mixed solvent)

Thereafter, these materials are kneaded for approximately 30 minutes. Then, the kneaded mixture was added with the above mentioned mixed solvent of 170 parts by weight and then diluted by the dissolver. Next, the mixture was dispersed by the sand grinder. Thus, a coating material was obtained. The coating material was filtered by a filter with a pore size of 0.3 μm. Thereafter, the coating material was mixed with Colonate L (tradename: 50 % diluted substance of a tolylenediisocyanate group hardener: Nippon Polyurethane K.K.) of 2.0 parts by weight. Thus, the coating material for the upper magnetic layer was obtained.

Thereafter, <coating material for the lower magnetic layer>, <coating material for intermediate layer> and <coating material for the upper magnetic layer> were loaded to respective slot die coaters in this order. The supplied coating materials were applied on a polyester film (thickness=11 μm). An electroconductive coating material containing carbon black had been already coated on the rear side of the polyester film. The thickness of the coated layer was controlled by the amount of coating material supplied to the dies. In this example, the dies were controlled so that the thicknesses of the lower magnetic layer, the intermediate layer, and the upper magnetic layer were 2.5 μm, 0.2 μm, and 0.3 μm, respectively. Before the three-layer coated film was dried, the film was passed through a solenoid which generated a magnetic field of approximately 6 kOe. Thus, the organic solvent evaporated and dried. Thereafter, the film was calendered by a conventional method.

The above mentioned coated film was kept in a cure oven at a temperature of 40° C. for four days and then slit in a 8-mm wide tape shape. This medium specimen was evaluated with respect to surface roughness, recording and reproduction characteristics, S/N ratio, and still durability. The evaluation results are listed in Table 1.

Embodiment 2

A three-layer coated type 8-mm wide tape was produced in the same manner as the embodiment 1 except that a Fe—Ni metal powder (Hc=1,500 Oe; number average particle diameter=0.15 μm; specific surface area=50 m$^2$/g) was used instead of the Co-, Ti-, Nb-substituted barium ferrite powder for use with the <coating material for upper magnetic layer> in accordance with the embodiment 1 and that the amount of the sulfonated urethane resin was 6 parts by weight. Thereafter, the tape was evaluated in the same manner as the embodiment 1.

Embodiment 3

Co-γ magnetite powder (Hc=600 Oe; number average particle diameter=0.5 μm; specific surface area=40 m$^2$/g) of 50 parts by weight and a Co-, Ti-, Nb-substituted barium ferrite powder (Hc=1,000 Oe; average particle diameter=0.05 μm; specific surface area=38 m$^2$/g) of 50 parts by weight were added to the compositions of <coating material for intermediate layer>. Thereafter, a coating material was obtained in the same coating material producing process as the <coating material for upper magnetic layer> in accordance with the embodiment 1. The obtained coating material was used instead of the <coating material for intermediate layer> in accordance with the embodiment 1. Thereafter, a three-layer coated type 8-mm wide tape was produced in the same manner as the embodiment 1 except that the thickness of the intermediate layer was 0.4 μm. Then, the obtained tape was evaluated in the same manner as the embodiment 1.

Embodiment 4

A Co-γ ferrite powder (Hc=600 Oe; number average particle diameter=0.5 μm; specific surface area=40 m$^2$/g) of 50 parts by weight and a Fe—Ni metal powder (Hc=1,500 Oe; number average particle diameter=0.15 μm; specific surface area=50 m$^2$/g) of 50 parts by weight were added to the compositions of <coating material for intermediate layer> in accordance with the embodiments 1 and 2. Thereafter, a coating material was obtained by the same coating material producing process as the <coating material for upper magnetic layer> in accordance with the embodiments 1 and 2. The obtained coating material was used instead of the <coating material for intermediate layer> in accordance with the embodiment 2. Then, a three-layer coated type 8-mm wide tape was produced in the same manner as the embodiment 2 except that the thicknesses of the intermediate layer and the upper magnetic layer were 0.3 μm and 0.15 μm, respectively. Then, the obtained tape was evaluated in the same manner as the embodiment 1.

Embodiment 5

A three-layer coated type 8-mm wide tape was produced in the same manner as the embodiment 1 except that a Co-γ magnetic powder (Hc=900 Oe; number average particle diameter=0.25 μm; specific surface area=45 m$^2$/g) was used instead of the Co-γ ferrite powder in the compositions of <coating material for lower magnetic powder> in accordance with the embodiment 1. Thereafter, the obtained tape was evaluated in the same manner as the embodiment 1.

Embodiment 6

A coating material was produced in the same coating material producing process as the <coating material for upper magnetic layer> in accordance with the embodiment 1 by using a Co-, Ti-, Nb-substituted barium ferrite powder (Hc=600 Oe; number average particle diameter=0.04 μm; specific surface area=40 m$^2$/g) instead of the Co-, Ti-, Nb-substituted barium ferrite powder in the compositions of <coating material for upper magnetic layer> in accordance with the embodiment 1. Then, a three-layer coated type tape was produced in the same manner as the embodiment 1 except that the obtained coating material was used instead of the <coating material for upper magnetic layer> in accordance with the embodiment 1, that a polyester film (film thickness=14 μm) was used, and that the slit width was ¼ inches. Thereafter, the obtained tape was evaluated in the same manner as the embodiment 1.

Embodiment 7

A three-layer coated type 8-mm tape was produced in the same manner as the embodiment 1 except that the amount of the sulfonated urethane resin in the compositions of <coating material for upper magnetic layer> in accordance with the embodiment 1 was 2 parts by weight. Thereafter, the obtained tape was evaluated in the same manner as the embodiment 1.

Embodiment 8

A three-layer coated type 8-mm tape was produced in the same manner as the embodiment 1 except that the amount of the stearin acid in the compositions of <coating material for upper magnetic layer> in accordance with the embodiment 1 was 3 parts by weight and that alumina (median diameter=0.2 μm) of 5 parts by weight was used instead of the alumina (median diameter=0.4 μm). Thereafter, the obtained tape was evaluated in the same manner as the embodiment 1.

Embodiment 9

Each of the <coating material for upper magnetic layer>, the <coating material for intermediate layer>, and the <coating material for lower magnetic layer> was supplied to a die coater. The die coater was provided with a head having three slots so as to supply three types of coating materials to the respective slots. By using this die coater, a film with the same thickness as the embodiment 1 was formed. Likewise, the three-layer coated 8-mm tape was produced. Thereafter, the obtained tape was evaluated in the same manner as the embodiment 1.

Embodiment 10

The three-layer coated medium specimen was obtained in the same manner as the embodiment 1 except that the amount of the Colonate L in the compositions of <coating material for upper magnetic layer> in accordance with the embodiment 1 was 1.0 part by weight and that the <coating material for intermediate layer> which was produced in the following manner was used. The evaluation results are listed in Table 1.

When the <coating material for intermediate layer> was produced, the following materials were mixed by the dissolver and then the mixture was filtered by a filter with a pore size of 0.3 μm.

Colonate L . . . 100 parts by weight
(Tradename: 50% diluted substance of a tolylenediisocyanate group hardener: Nippon Polyurethane K.K.)
Myristic acid . . . 15 parts by weight
Butyl stearate . . . 15 parts by weight
Cyclohexanone/methyl ethyl ketone . . . 50 parts by weight (1/1 mixed solvent)

Thereby, a coating material for the intermediate material was obtained.

Embodiment 11

A magnetic coating material was produced in the same manner as the <coating material for upper magnetic coating material> in accordance with the embodiment 10 except that the alumina was excluded from the compositions of <coating material for upper magnetic layer> in accordance with the embodiment 10.

A coating material for the intermediate layer was produced in the same manner as the <coating material for intermediate layer> in accordance with the embodiment 10 except that alumina was added to the compositions of <coating material for intermediate layer> in accordance with the embodiment 10.

The same coating material for the lower magnetic layer as the <coating material for lower magnetic coating material> in accordance with the embodiment 1 was used. First, only a lower magnetic layer was formed on the same polyester film as the embodiment 1. Then, the three-layer coated medium specimen was obtained in the same manner as the embodiment 1 except that the coating materials for the upper magnetic layer and the intermediate layer were coated on the lower magnetic layer at the same time. The evaluation results are shown in Table 1.

Comparison Examples 1 to 3

Two-layer coated type 8-mm tapes as comparison examples 1 to 3 were produced in the same manner as the embodiments 1, 2, and 7 respectively except that no intermediate layer was disposed. Thereafter, these tapes were evaluated in accordance with the embodiment 1.

Comparison Example 4

A three-layer coated type 8-mm tape was produced in the same manner as the embodiment 1 except that the amount of the sulfonated urethane resin in the compositions of <coating material for upper magnetic layer> in accordance with the embodiment 1 was 1 part by weight and that the amount of the Colonate L added to the obtained coating material was 0.5 parts by weight. Thereafter, the tape was evaluated in the same manner as the embodiment 1.

Comparison Example 5

A three-layer coated type 8-mm tape was produced in the same manner as the embodiment 1 except that the amount of the sulfonated urethane resin in the compositions of <coating material for upper magnetic layer> in accordance with the embodiment 1 was 12 parts by weight and that the amount of the Colonate L added to the obtained coating material was 3 parts by weight. Thereafter, the obtained tape was evaluated in the same manner as the embodiment 1.

For the evaluation of the above mentioned multilayer coated type tape specimens, the surface roughness, recording and reproduction characteristics, S/N ratio, and still durability were measured. The evaluation results are listed in Table 1. For measurement of the recording and reproduction characteristics and the S/N ratio, an S-VHS deck and a high-band 8-mm deck were used.

TABLE 1

| Specimen | Surface roughness Rz (μm) | Recording and reproduction output (dB) $\lambda = 1.5\ \mu m$ | $\lambda = 0.5\ \mu m$ | S/N (dB) $\lambda = 0.5\ \mu m$ | Still durability 25° C., 60% RH |
|---|---|---|---|---|---|
| Embodiment 1 | 0.020 | +1.0 | +1.5 | +1.0 | 120 min or more |
| Embodiment 2 | 0.020 | +1.5 | +1.5 | +1.0 | 120 min or more |
| Embodiment 3 | 0.015 | +2.0 | +2.0 | +1.0 | 120 min or more |
| Embodiment 4 | 0.015 | +2.0 | +2.0 | +1.0 | 120 min or more |
| Embodiment 5 | 0.018 | +2.0 | +2.0 | +1.0 | 120 min or more |
| Embodiment 6 | 0.015 | +2.0 | +2.0 | +0.5 | 120 min or more |
| Embodiment 7 | 0.015 | +2.5 | +2.5 | +0.5 | 120 min or more |
| Embodiment 8 | 0.015 | +1.0 | +1.5 | +1.5 | 120 min or more |
| Embodiment 9 | 0.015 | +1.0 | +1.5 | +1.5 | 120 min or more |
| Embodiment 10 | 0.018 | +1.5 | +2.0 | +1.0 | 120 min or more |
| Embodiment 11 | 0.015 | +2.0 | +2.0 | +1.0 | 120 min or more |
| Comp. Ex. 1 | 0.038 | 0.0 | 0.0 | 0.0 | 45 min |
| Comp. Ex. 2 | 0.040 | −0.5 | +0.5 | −0.5 | 40 min |
| Comp. Ex. 3 | 0.035 | −0.5 | −1.0 | −0.5 | 25 min |
| Comp. Ex. 4 | 0.035 | −0.5 | −3.0 | −2.0 | 5 min |

TABLE 1-continued

| Specimen | Surface roughness Rz (μm) | Recording and reproduction output (dB) λ = 1.5 μm | λ = 0.5 μm | S/N (dB) λ = 0.5 μm | Still durability 25° C., 60% RH |
| --- | --- | --- | --- | --- | --- |
| Comp. Ex. 5 | 0.045 | −1.5 | −5.0 | −2.0 | 30 min |

As described above, according to the multi-layer coated type magnetic recording medium of the present invention, the intermediate layer is disposed between the upper magnetic layer and the lower magnetic layer. The upper magnetic layer contains a magnetic powder with high Hc, small particle diameter, and high packing ratio, the magnetic powder being dispersed in almost primary particle state. Thus, the upper magnetic layer which is remarkably smooth can be obtained. Therefore, the multi-layer coated type magnetic recording medium provides excellent characteristics for recording and reproduction both in short wavelength range and long wavelength range. In particular, the reproduction output in the short wavelength range can be further improved.

Moreover, the intermediate layer allows the upper magnetic layer to be strongly adhered to the lower magnetic layer, thereby further improving the running durability of the recording medium. When a polyisocyanated compound whose molecular weight is less than 1,000 is used as a resin binder which is a main component of the intermediate layer, the intermediate layer further provides the effect for preventing the upper magnetic layer from peeling off from the lower magnetic layer. Furthermore, since the intermediate layer has a significant effect for preventing a corrosive substance from penetrating through the layers, it is possible to prevent Co denatured iron oxide or a metal powder contained in the lower magnetic layer from being deteriorated.

What is claimed is:

1. A magnetic recording medium comprising:
   a non-magnetic base material;
   a lower magnetic layer comprising a first magnetic powder for recording in a long wavelength range and a first resin binder, said lower magnetic layer being disposed on said non-magnetic base material, the lower magnetic layer having a thickness from 1 to 3 μm;
   an intermediate layer consisting of non-magnetic material including a second resin binder, said intermediate layer being disposed on said lower magnetic layer; and
   an upper magnetic layer comprising a second magnetic powder for recording in a short wavelength range and a third resin binder, the amount of said third resin binder being in the range from 2 to 12 parts by weight for 100 parts by weight of the second magnetic powder, said upper magnetic layer being disposed on said intermediate layer.

2. The magnetic recording medium according to claim 1, wherein the thickness of said upper magnetic layer is in the range from 0.05 to 0.5 μm.

3. The magnetic recording medium according to claim 1, wherein the third resin binder comprises a resin having a polar group.

4. The magnetic recording medium according to claim 3 wherein the polar group is at least one selected from the group consisting of —SO$_3$M and —OSO$_3$M, where M is hydrogen or an alkali metal atom.

5. The magnetic recording medium according to claim 3, wherein the content of the polar group of said third resin binder is in the range from 0.01 to 4.0 mmol/g.

6. The magnetic recording medium according to claim 1, wherein the thickness of said intermediate layer is in the range from 0.05 to 0.3 μm.

7. The magnetic recording medium according to claim 1, wherein the second resin binder comprises a polyisocyanate compound whose molecular weight is 1,000 or less.

8. The magnetic recording medium according to claim 1, wherein said intermediate layer further comprises a lubricant.

9. The magnetic recording medium according to claim 1, wherein said intermediate layer further comprises an abrasive.

10. The magnetic recording medium according to claim 1, wherein the first magnetic powder has a coercive force in the range from 300 to 1,000 Oe and a saturation magnetization of 70 emu/cc or more.

11. The magnetic recording medium according to claim 1, wherein the second magnetic powder consists essentially of iron containing metal powder having a coercive force in the range from 500 to 3,000 Oe and a particle diameter in the range from 0.05 to 0.3 μm.

12. The magnetic recording medium according to claim 1, wherein the second magnetic powder consists essentially of a hexagonal ferrite powder having a coercive force in the range from 500 to 3,000 Oe and a particle diameter in the range from 0.01 to 0.1 μm.

13. The magnetic recording medium according to claim 12, wherein said hexagonal ferrite powder includes Nb atoms.

14. The magnetic recording medium according to claim 1, wherein the amount of the third resin binder is in the range from 3 to 8 parts by weight for 100 parts by weight of the second magnetic powder.

* * * * *